Figure 1:
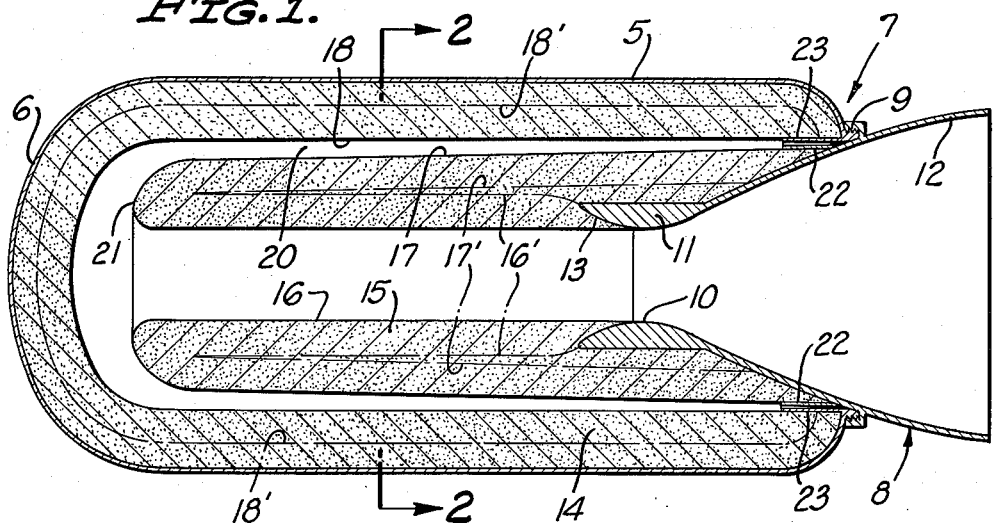

June 29, 1965 R. M. PIERCE 3,191,379
PROPELLANT GRAIN FOR ROCKET MOTORS
Filed March 8, 1961

INVENTOR.
RALPH M. PIERCE
BY Herbert E. Kidder
AGENT

3,191,379
PROPELLANT GRAIN FOR ROCKET MOTORS
Ralph M. Pierce, Redlands, Calif.; granted to National Aeronautics and Space Administration under provisions of 42 U.S.C. 2457(a)
Filed Mar. 8, 1961, Ser. No. 94,259
3 Claims. (Cl. 60—35.6)

This invention relates to solid propellant rocket motors, and more particularly to a novel configuration of the propellant grain, which is loaded in the motor case.

Solid propellant rocket motors, as presently developed, usually comprise a cylindrical shell containing a monolithic grain of propellant having a central bore which opens directly into the nozzle throat. Ignition of the propellant is initiated over the exposed surface of the central bore, and the gaseous combustion products pass out through the nozzle. Combustion proceeds normal to the burning surface, and during the burning period, certain portions of the propellant burn out to the shell before other portions, exposing the shell to the extremely high temperature combustion process as slivers of propellant continue to burn. This results in severe heating of the case, which necessitates the use of heavy insulation to prevent case failure.

The primary object of the present invention is to provide a solid propellant rocket motor which is so constructed and arranged that the propellant grain burns through to the case over its entire inner surface at the instant of complete burnout. Thus, during the burning period of the rocket motor, the propellant itself serves as thermal insulation for the case, shielding the latter against the high temperature combustion gases, and at the moment any of the case is first exposed to the hot gases, the combustion process ceases, due to exhaustion of the propellant.

By eliminating exposure of the motor case wall to the combustion process, the need for thermal insulation to prevent case failure is likewise eliminated. An important advantage of the invention is that it permits a substantial reduction in dead weight, and provides a rocket motor having an extremely high ratio of propellant weight to total engine weight, which is essential in a high performance motor.

Another object of the invention is to provide a solid propellant rocket motor in which the nozzle serves both as a part of the aft head closure, and also as a hollow supporting rod for the inner propellant tube. By thus eliminating a separate supporting rod for the inner propellant tube and a full aft head closure entirely separate from the nozzle, the present invention further eliminates dead weight and increases the ratio of propellant weight to total engine weight.

Still a further object of the present invention is the provision of a new and improved propellant grain configuration in which one portion of the burning area progresses during combustion, while another portion of the burning area retrogresses. The net progressivity of the total motor can thus be controlled to prevent development of excessive combustion chamber pressure during the burning period.

These objects are achieved in the present invention by using a propellant grain configuration consisting of a hollow outer shell of propellant which completely covers the inner surface of the motor case, and an inner tube of propellant disposed concentrically within the said hollow shell, the said inner tube of propellant being supported at one end on an inwardly projecting nozzle. Combustion gases generated by burning of the propellant on the facing areas of the outer shell and tube flow forwardly and then are reversed in direction to flow rearwardly through the hollow center of the tube and out through the nozzle. The thickness of the outer shell of propellant is such that the entire inner tube is consumed before the outer shell burns through to the case. Thus, at the moment the case is first exposed, combustion ceases due to exhaustion of the propellant.

Figure 2:
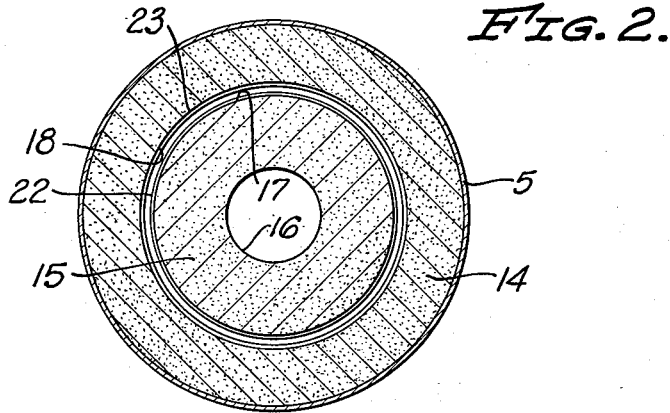

The foregoing and other objects and advantages of the present invention will become apparent to those skilled in the art upon consideration of the following detailed description of the preferred embodiment thereof, reference being had to the accompanying drawing, wherein;

FIGURE 1 is a longitudinal sectioned view through a solid propellant rocket motor embodying the principles of the present invention; and FIGURE 2 is a transverse sectional view of the same, taken at 2—2 in FIGURE 1.

Referring more particularly to the drawing, the rocket motor of the present invention comprises a generally elongated cylindrical shell or case 5 having a rounded end closure 6 at one end thereof, and an open end 7 at the other extremity through which a nozzle projects. The nozzle 8 may be secured to the case 5 in any suitable manner, as by the threaded connection 9. The nozzle 8 projects into the interior of the case 5 for a substantial distance, and only the outer end thereof projects rearwardly beyond the end of the case. The nozzle 8 is provided with a restricted throat section 10, which is preferably enlarged in thickness at 11, and this throat section merges at its rear end into an outwardly flared, bell-shaped expansion section 12, in which the combustion gases expand and accelerate to supersonic velocities. At its front end, the throat section 10 expands in diameter at 13 to form what is referred to in the art as the "convergent section."

The propellant charge of the present invention comprises an outer shell 14 and a separate inner tube 15, each of which is a single propellant grain. The outer shell 14 covers the entire inner surface of the case 5 and end closure 6 with a substantially uniform thickness of propellant, which is proportioned so as to burn out to the case simultaneously over the entire inner surface thereof. Where it is found that the outer shell 14 of propellant tends to burn at a non-uniform rate owing to non-uniform pressure and gas flow conditions within the combustion chamber, it may be necessary to increase the thickness of the shell 14 in certain areas in order to obtain simultaneous burn-out at all points.

The inner tube 15 of propellant is generally tubular in configuration, with a cylindrical bore 16 extending through the center thereof, and a slightly conical outer surface 17 which cooperates with the facing inner surface 18 of the shell 14 to form a forwardly diverging annular passage 20. The front end of the tube 15 is rounded at 21 and spaced from the shell of propellant covering the end closure 6 so as to provide an inwardly turned passageway connecting the front end of the passage 20 with the front end of the bore 16. At the extreme rear end of the passage 20, the tube 15 is coated with a layer 22 of ignition inhibitor, and the facing area of the outer shell 14 is likewise coated with a layer 23 of ignition inhibitor.

Ignition of the propellant grains 14 and 15 is initiated by any suitable igniter means, and combustion takes place over the entire exposed surface of the propellant. Combustion gases generated by burning on the facing surfaces 17 and 18, flow forwardly through the annular channel 20 and then reverse in direction to flow rearwardly through the central bore 16 and out through the nozzle throat 10 and expansion section 12. Burning proceeds normal to the exposed surface, and the burning surfaces 16 and 18 progress in surface area, while the burning surface 17 retrogresses in surface area. This retrogressivity of the tube burning surface 17 counteracts, to some extent, the progressivity of the shell burning surfaces 16 and 18, with the result that the net progressivity of the total motor remains within reasonable bounds, and development of excessive pressure in the combustion chamber is prevented.

One important relationship of the present invention is that the respective thicknesses of the tube 15 and shell 14 must be such that the tube 15 is entirely consumed before the shell 14 burns out against the case 5. Since the tube 15 burns on both its inner surface 16 and outer surface 17, the total thickness of the tube 15 may be somewhat more than the thickness of the shell 14. Also it is contemplated that the tube 15 might be made of one type of propellant, and the shell 14 another type of different burning rate, in which case the thickness dimensions would vary according to the burning rate of the propellant involved.

In FIGURE 1, the reference numerals 16', 17' and 18' designate the burning surfaces at a point slightly more than halfway through the burning period. It will be noted that the shell 14 has burned back to slightly less than half its original thickness, whereas the tube 15 has burned down to a very thin wall thickness, tapering down to a knife edge at its front end. At this point, the tube 15 is about to start burning back rapidly from its front, or left hand, end, and in a very brief period of time will have burned away completely, leaving only the shell 14 and a thin collar of propellant encircling the inner end of the nozzle.

While I have shown and described in considerable detail what I believe to be the preferred form of my invention, it will be understood by those skilled in the art that various changes may be made in the shape and arrangement of the several parts without departing from the broad scope of my invention, as defined in the appended claims.

I claim:

1. A solid propellant rocket motor comprising a generally cylindrical case having a rounded end closure at the front end thereof and a nozzle at the rear end thereof, said nozzle including a restricted throat section and an outwardly flared expansion section, said case being joined to said nozzle adjacent the expanded rear end of said flared expansion section so that the nozzle forms a substantial portion of the rear end closure of said case, said nozzle projecting into the interior of said case, a shell of solid propellant bonded to the interior of said case over the entire inner surface thereof, said shell being of substantially uniform thickness and having an inner surface which is ignited to form a burning surface, a tubular body of solid propellant surrounding the inwardly projecting portion of said nozzle and bonded thereto, said tubular body having a cylindrical central bore which opens into said throat section of said nozzle, and said tubular body having a slightly conical outer surface which cooperates with the facing surface of said shell to form a rearwardly diverging annular passageway, said annular passageway connecting at its rear end in sealing engagement to the case connecting at its front end to the front end of said central bore so that the combustion gases generated at the burning surfaces of said propellant on opposite sides of said passageway pass forwardly along said passageway and then reverse in direction and pass rearwardly along said central bore to exhaust through said nozzle, said tubular body of propellant being of a thickness such that it is entirely consumed before said shell is consumed, and the thickness of said shell being such that it burns out to said case simultaneously over the entire area thereof, so that combustion ceases due to exhaustion of said propellant at the same instant said case is exposed to combustion gases.

2. A solid propellant rocket motor comprising a cylindrical casing having one end closed and the other end open, a grain of solid propellant bonded over the entire inner surface of said casing, a tubular configuration of propellant grain inserted within the open end of said casing and spaced from the grain on said casing, said tubular configuration being characterized in that the propellant is combustible on all surfaces of the tube, a nozzle, means for attaching said nozzle to the open end of said casing, said nozzle projecting into said casing and into said tubular configuration, means including a portion of said nozzle for closing the space between said casing and said tubular configuration adjacent the open end of said casing, whereby upon ignition of said propellant combustion progresses on the casing and tubular configuration simultaneously and the combustion products pass through the space toward the closed end of said casing and out through the tubular portion and nozzle.

3. A solid propellant rocket motor comprising a cylindrical casing having a rounded end closure at one end and an opening at the other end, a tubular body of solid propellant grain having a cylindrical bore and positioned within said casing concentrically with and spaced therefrom and defining an annular space, a grain of solid propellant bonded to the entire inner surface of the casing, means closing the annular space between the open end of the casing and said tubular body, an outwardly flared nozzle attached to the open end of the casing and extending into the cylindrical bore, whereby after ignition the combustion products of said grain pass forward through the annular space toward the closed end of the casing and then out through the cylindrical bore, combining with the combustion products of the tubular body and continuing out through said nozzle.

References Cited by the Examiner

UNITED STATES PATENTS

| | | | |
|---|---|---|---|
| 1,879,579 | 9/32 | Stolfa et al. | 60—35.6 |
| 2,440,305 | 4/48 | Skinner | 60—35.6 |
| 2,623,465 | 12/52 | Jasse | 60—35.6 |
| 2,814,179 | 11/57 | Edelman et al. | 60—35.6 |
| 2,865,456 | 12/58 | Dennis | 60—39.47 |
| 2,974,484 | 3/61 | Cooley | 60—35.6 |

SAMUEL LEVINE, *Primary Examiner.*

SAMUEL FEINBERG, *Examiner.*